Feb. 17, 1931.  G. B. SCHMIDT ET AL  1,792,769
FEATHER DRIER
Filed March 29, 1930

Inventors
George B. Schmidt
Frank H. Pecht
By Lynn H. Latta
Attorney

Patented Feb. 17, 1931

1,792,769

UNITED STATES PATENT OFFICE

GEORGE B. SCHMIDT AND FRANK H. PECHT, OF SIOUX CITY, IOWA

FEATHER DRIER

Application filed March 29, 1930. Serial No. 439,982.

Our invention relates to a machine for drying feathers in produce plants and has for its object to provide an improved type of feather drier which is competent to handle feathers in wet condition.

The former practice in produce houses was to pluck chickens and other poultry without scalding and the process of drying the feathers was handled in a simple machine wherein the heat for drying was supplied by a heating chamber on the exterior of the receptacle in which the feathers were dried. Poultry houses are now plucking their poultry by the scalding process and this leaves the feathers in a wet condition which multiples the difficulty of drying considerably.

Our invention aims to provide a machine adapted to speed up the process of drying feathers.

Rapidity of drying is accomplished in our invention by transmitting heat into the mass of feathers within the drier through the medium of the agitating arms of an agitator. The most simple method of accomplishing this is embodied in the use of a rotating agitator, the shaft of which constitutes a passageway for steam, the heating medium. With a rotating agitator, the steam can be carried to the shaft through rigid connections and through the medium of packing glands which allow relative rotation between the connections.

A further object of our invention is to provide a drier adapted to allow the rapid escape of moisture.

Another object is to provide a machine having a very simple arrangement for allowing the feathers to be removed from the machine.

Another object of our invention is to provide a machine which is comparatively simple, durable and inexpensive in construction.

Another object of our invention is to provide a machine which will counteract the tendency of the feathers to stick together.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figures 1, 2:
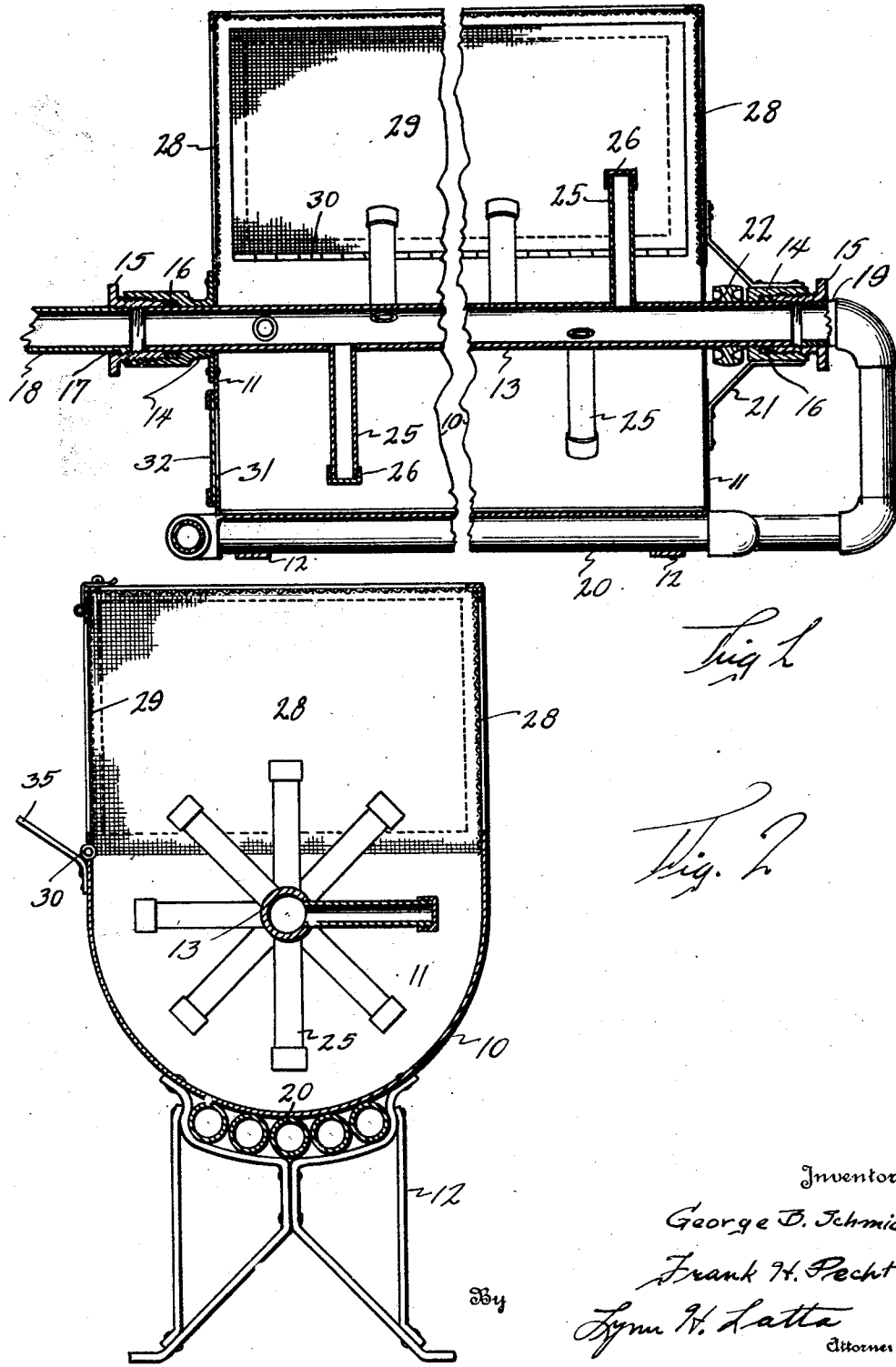
Fig. 1 is a longitudinal, sectional view through the machine.
Fig. 2 is a transverse, sectional view through the machine.

The machine comprises a receptacle or drum having the semi-cylindrical side wall 10 and the end walls 11 and a supporting base 12.

The pipe 13 is mounted in bearings 14 secured to an end wall 11 and a bracket 21 respectively and is positioned axially relative to the semi-cylindrical portion of the wall 10. The bearings 14 also serve as packing glands in conjunction with threaded nuts 15 and packing rings 16.

Thus the pipe 13 may rotate in the bearings 14.

A nut 15 serves as a steam connection to carry steam to the pipe 13, being provided with a threaded nipple 17 to which may be attached a steam pipe or the like 18.

One end of the pipe 13 is connected by means of the pipe 18 to a suitable source of steam and the other end is connected by a pipe 19 to a steam coil 20 lying in contact with the under surface of the receptacle 10. From the coil 20 the steam may be carried to a condensation trap, from whence it passes back to the boiler in the form of water.

Between the bracket 21 and the end wall 11 a pulley 22 is mounted on the pipe 13. Either a pulley or a sprocket may be used, and a belt or chain, not shown, will be connected with the pulley or sprocket to deliver power to the pipe 13 to cause it to rotate.

It may be noted in this connection that it is not essential that a perfectly steam-tight joint be had between the pipe 13 and the end wall 11 although a steam-tight joint is desired between the packing glands and the pipes 18 and 19 respectively. This is because the steam will be passed through the pipes under some pressure, whereas the steam within the receptacle will arise from the drying of the feathers and its escape from the receptacle is desired.

The spacing of the packing gland from the end wall 11 by means of the bracket 21 makes it possible to mount the pulley directly on the pipe 13 and simplifies construction considerably. If a shaft were employed to transmit rotation to the pipe, it would be necessary to employ two packing glands at that end of the machine.

Screwed into the pipe 13 at intervals are a series of heater arms 25, closed at their outer ends by caps 26 but open at their inner ends and communicating with the pipe 13.

It will now be noted that the pipe 13 and arms 25 constitute a revolving beater, internally heated by steam passing through the pipe 13 and entering the arms 25.

The steam after it has passed through the beater is utilized in heating the wall of the container 10.

The pipe 13 may rotate within the bearings 14 but the packing nuts 15 and pipes 18, 19 and 20 are stationary.

The top of the receptacle is made of screen as shown in order to allow the vapor produced by agitating the feathers with the heated beater to escape upwardly.

The side walls of the receptacle are also made of screen as at 28, the screened openings extending from a level somewhat above the pipe 13 to the top of the receptacle.

A screened door 29 is hinged at 30 on a horizontal axis at the lower extremity of one of the side openings of the receptacle, and constitutes one of the screened sides thereof. The door 29 is thus hinged so as to swing downwardly from the upstanding closed position shown in Fig. 2 to a position inclined upwardly and outwardly from the machine, where it is supported by brackets 35, and acts as a chute to facilitate the pouring of the feathers through the side-opening into the receptacle.

In one end of the receptacle, near the bottom, is an opening 31, through which the feathers are discharged, the operator inserting a stick through the side opening of the door 29, and moving the feathers toward the end opening 31, allowing the beater to revolve slowly while doing so in order that the arms of the beater may consecutively move out of the path of the stick.

The direct contact of the heated arms 25 in passing through the mass of feathers will quickly dry the soaked feathers, the dried feathers working toward the top and the damper ones remaining at the bottom.

While solid arms, made of metal and joined to the hollow steam pipe 13 so as to carry heat therefrom by conduction, might be employed with good results, the most efficient results are obtained in the use of the hollow arms into which the steam will enter.

A certain amount of water of condensation will collect within the arms 25, but as each arm travels about the horizontal, this water will flow into the pipe 13. It may now be noted that the arms 25 are staggered in the irregular arrangement, so that as the water flows from one arm, it will not be possible for it to flow directly into another arm. The moving force of the steam flowing through the pipe 13 will cause the water as it flows out of the arm 25 to flow in the direction of movement of the steam, and although it may again flow into another arm farther down the line, the water of condensation will all eventually find its way out of the machine through the pipe 19.

The rising fumes of vapor created by the contact of the heated arm with the damp feathers, will escape through the screen top of the receptacle.

Another advantage of the staggered relation of the arms resides in the fact that there will be no tendency for the arms to rotate the feathers enmasse.

The opening 31 is closed by a sliding door 32.

Some changes may be made in the construction and arrangement of the parts of our invention without departing from the real spirit and purposes of our invention, and it is our intention to cover by our claims, any modified forms of structure or use of mechanical equivalents, which may be reasonably included within their scope.

We claim as our invention:

1. In a feather drier, a receptacle having end walls, a steam pipe extending through the receptacle and through said end walls, combined bearings and packing glands supported in fixed positions relative to the receptacle and encasing the ends of the steam pipe so as to allow rotation thereof, a plurality of tubular agitator arms secured to the steam pipe and extending so as to project into a mass of feathers contained in the receptacle and means communicating with the packing glands for carrying steam to and from the steam pipe.

2. In a feather drier, a receptacle having end walls, a steam pipe extending through said end walls and through the receptacle, combined bearings and packing glands supported in fixed relation to the receptacle and encasing the ends of the pipe, agitating means secured to the steam pipe and means communicating with the packing glands for carrying steam to and from the pipe.

3. In a feather drier, a receptacle having end walls, a steam pipe extending through said end walls and through the receptacle, combined bearings and packing glands supported in fixed relation to the receptacle and encasing the ends of the pipe, agitating means secured to the steam pipe and means communicating with the packing glands for carrying steam to and from the pipe, said means including a steam coil arranged beneath and closely associated with the bottom of the receptacle.

4. In a feather drier, a receptacle having end walls, a steam pipe extending through the receptacle and through said end walls, combined bearings and packing glands supported in fixed positions relative to the receptacle and encasing the ends of the steam pipe so as to allow rotation thereof, a plurality of tubular agitator arms secured to the steam pipe and extending so as to project into a mass of feathers contained in the receptacle and means communicating with the packing glands for carrying steam to and from the steam pipe. One of the packing glands being spaced from the end wall of the receptacle, and a drive pulley mounted on the pipe between said last mentioned gland and the receptacle.

Signed this 26 day of March, 1930, in the county of Woodbury and State of Iowa.

GEO. B. SCHMIDT.
FRANK H. PECHT.